(12) United States Patent
Hirai et al.

(10) Patent No.: US 7,824,106 B2
(45) Date of Patent: Nov. 2, 2010

(54) BEARING DEVICE FOR WHEEL

(75) Inventors: Isao Hirai, Iwata (JP); Takayasu Takubo, Iwata (JP); Kazuhiko Yoshida, Iwata (JP)

(73) Assignee: NTN Corporation, Osaka (JP)

( * ) Notice: Subject to any disclaimer, the term of this patent is extended or adjusted under 35 U.S.C. 154(b) by 1090 days.

(21) Appl. No.: 10/592,108

(22) PCT Filed: Mar. 3, 2005

(86) PCT No.: PCT/JP2005/003575
§ 371 (c)(1),
(2), (4) Date: Sep. 8, 2006

(87) PCT Pub. No.: WO2005/088146
PCT Pub. Date: Sep. 22, 2005

(65) Prior Publication Data
US 2007/0201783 A1    Aug. 30, 2007

(30) Foreign Application Priority Data
Mar. 10, 2004    (JP) .............................. 2004-067439

(51) Int. Cl.
F16C 19/08    (2006.01)
F16C 33/64    (2006.01)
B60B 35/18    (2006.01)

(52) U.S. Cl. ...................................... 384/544

(58) Field of Classification Search ................. 384/544, 384/625, 637, 589, DIG. 12, DIG. 13
See application file for complete search history.

(56) References Cited

U.S. PATENT DOCUMENTS

| 6,280,096 | B1 | 8/2001 | Miyazaki et al. |
| 2003/0123769 | A1 | 7/2003 | Ohki |
| 2004/0252926 | A1 | 12/2004 | Tajima |
| 2005/0141799 | A1 | 6/2005 | Uyama et al. |

FOREIGN PATENT DOCUMENTS

| DE | 103 23 447 A1 | 1/2004 |
| EP | 1 541 377 A1 | 6/2005 |
| JP | 54-106016 A | 8/1979 |

(Continued)

OTHER PUBLICATIONS

Japanese Office Action issued in corresponding Japanese Patent Application No. 2004-067439, dated Oct. 17, 2006.

(Continued)

Primary Examiner—William C Joyce
(74) Attorney, Agent, or Firm—McDermott Will & Emery LLP (57) ABSTRACT

A bearing device for a wheel enabling the easy control of quality since there is no possibility of cracking even if caulking is applied thereto. The bearing device comprises an outer ring having double rows of raceway surfaces on the inner periphery thereof, an inner member having raceway surfaces opposed to the raceway surfaces, and balls interposed between the double rows of raceway surfaces opposed to each other. The inner member further comprises a HUB ring and an inner ring. Caulking is applied to the HUB ring to join it to the inner ring. The grain size number of the austenite grains of a caulked section is at least 6.

4 Claims, 9 Drawing Sheets

FOREIGN PATENT DOCUMENTS

| | | |
|---|---|---|
| JP | 5-142126 | 6/1993 |
| JP | 08-311615 | 11/1996 |
| JP | 9-3595 | 1/1997 |
| JP | 11-129703 A | 5/1999 |
| JP | 11-269553 A | 10/1999 |
| JP | 2001-279490 A | 10/2001 |
| JP | 2003-113450 A | 4/2003 |
| JP | 2003-226919 A | 8/2003 |
| JP | 2003-277878 A | 10/2003 |
| JP | 2004-28143 A | 1/2004 |
| WO | WO 2004/007219 A1 | 1/2004 |

OTHER PUBLICATIONS

Japanese Office Action issued in corresponding Japanese Patent Application No. 2004-067439 dated Jan. 23, 2007.

European Search Report issued in European Patent Application No. 05719879.8, mailed Mar. 19, 2009.

EXAMPLE 1 OF INVENTION

FIG.8

EXAMPLE 2 OF INVENTION

FIG.9

EXAMPLE 3 OF INVENTION

FIG.10

EXAMPLE 4 OF INVENTION

FIG.11

COMPARATIVE EXAMPLE 1

EXAMPLE 6 OF INVENTION

FIG.16 PRIOR ART

BEARING DEVICE FOR WHEEL

RELATED APPLICATIONS

This application is the U.S. National Phase under 35 U.S.C. §371 of International Application No. PCT/JP2005/003575, filed on Mar. 3, 2005, which in turn claims the benefit of Japanese Application No. 2004-067439, filed on Mar. 10, 2004, the disclosures of which Applications are incorporated by reference herein.

TECHNICAL FIELD

This invention relates a bearing device for a wheel, or in particular, to a bearing device for a wheel including parts for caulking such a HUB ring for the wheel bearing.

BACKGROUND ART

A hub bearing (HUB) is a bearing device for a wheel for rotatably supporting a tire (wheel) on a vehicle body. Also, a Constant Velocity Joint (CVJ) is a torque transmission unit for transmitting the rotation from an engine to a wheel. The HUB and the Constant Velocity Joint have the following manufacture problems:
(1) A stepped shape requiring a high working ratio is included.
(2) A presence of rolling contact surfaces requires portions with high hardness after high-frequency induction hardening process. For this reason, steel having a high carbon content such as S53C or SAE1050 is used, thereby increasing deformation resistance in the working process.

Due to the situation described above, cold forging and warm forging are difficult and therefore hot forging is widely used. In the case of hot forging, the forging temperature reaches as high as 1000° C. or more, and therefore the micro structure after forging is coarsened.

Generally, in the bearing device for a wheel, a large load is repeatedly imposed, and therefore the hardening process is carried out after the hot forging process thereby to secure a sufficient strength of the bearing device for a wheel. In this bearing device for a wheel, a roll member is held from both sides by an outer member (outer ring) and an inner member (inner ring). The inner member is configured of two first and second inner members such as a HUB ring and an inner ring. To promote the reduction of the number of parts, the caulking process is used as a coupling means for coupling the two inner members.

In the case where the hardening process is executed after the hot forging as described above, the hardness of the product extremely increases and therefore the caulking process is hampered. For this reason, a roll bearing unit for supporting a wheel has been proposed (Japanese Patent Laying-Open No. 11-129703 (Patent Document 1)) in which the portion plastically deformed by the caulking process is not hardened in the hardening process. In this method, the portion plastically deformed by the caulking process is not hardened, and therefore the hardness of the particular portion is reduced.

Patent Document 1: Japanese Patent Laying-Open No. 11-129703

DISCLOSURE OF THE INVENTION

Problems to be Solved by the Invention

The structure of the portion caulked and plastically deformed as described above, however, remains in an as-hot-forged (raw) state and coarse.

Figure 16:
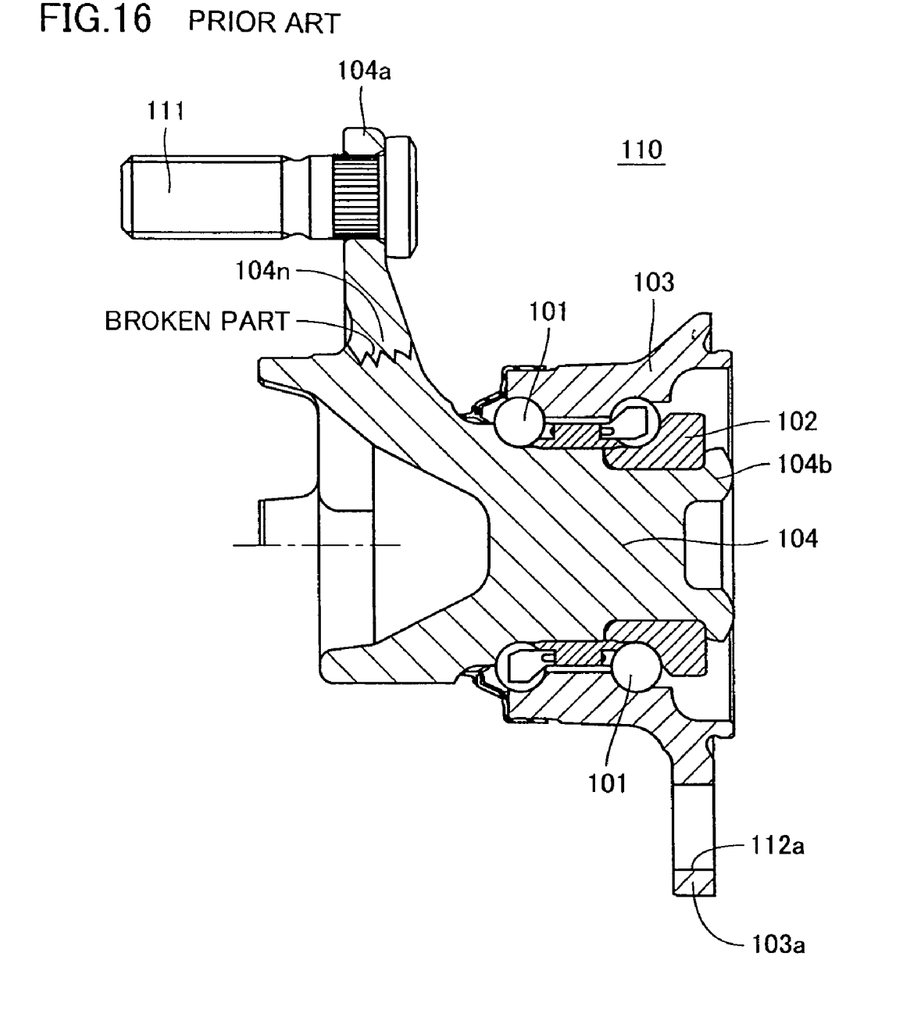
FIG. 16 is a diagram showing one of the problems of a conventional bearing device for a wheel.

FIG. 16 is a diagram showing a bearing device for a wheel 110 for non-driven wheels. Balls 101 are arranged between a HUB ring 104, an inner ring 102 and an outer ring 103. Outer ring 103 has a flange 103a, which is formed with a bolt hole 112a to insert a bolt therethrough to fix on a vehicle body (knuckle) not shown. HUB ring 104 and a tire not shown are coupled to each other by a bolt 111 arranged at the forward end of a wheel mounting flange 104a of HUB ring 104.

The inboard side end (far from wheel mounting flange 104a) of HUB ring 104 is caulked to be coupled with inner ring 102, with the result that HUB ring 104 and inner ring 102 are coupled to each other by a caulked portion 104b. The micro structure coarsened as described above is so low in ductility that a cracking is liable to occur at the time of the caulking process, and therefore the processing conditions for the caulking process are required to be determined with utmost care, thereby making it necessary to conduct the total inspection to guarantee the quality.

The repetitive displacement transmitted from the tire generates a large repetitive stress in a root 104n of wheel-mounting flange 104a constituting a joint with the tire. In the case where wheel-mounting flange 104a is formed in the shape of an arm to reduce the weight of the bearing device for a wheel, however, the durability of the micro structure coarsened in the as-hot-forged state not hardened is reduced and a cracking occurs. As a result, the breakage would result and the reduction in weight is made difficult.

Means for Solving the Problems

A first object of this invention is to provide a bearing device for a wheel in which a cracking is not easily caused by caulking in the as-hot-forged state, and for which the processing conditions can be easily determined and the management for quality control is facilitated. A second object is to provide a bearing device for a wheel in which the durability is not reduced and the weight can be easily reduced even in the case where the wheel-mounting flange is formed in the shape of an arm.

The bearing device for a wheel according to this invention includes an outer member having a plurality of rows of raceway surfaces on the inner periphery thereof, an inner member having raceway surfaces in opposed relation to the aforementioned raceway surfaces and rolling elements interposed between the plurality of rows of raceway surfaces in opposed relation to each other, wherein the inner member includes a first inner member and a second inner member. In this bearing device for a wheel, the first inner member and the second inner member are coupled to each other by caulking the first inner member and the wheel is rotatably supported on the vehicle body. The grain size number of the austenite grains of at least the caulked portion is 6 or higher.

In this configuration, the structure is fined and therefore the ductility is improved. Thus, no cracking is liable to occur in the caulking process, thereby facilitating the management for quality control.

In view of the fact that the plastization such as the caulking process changes the structure due to plastic deformation, the grain size number of the austenite grains is defined as the one before plastic deformation. After caulking, therefore, the grain size is measured at the root of the caulked portion other than the plastically deformed portion, where no structure change has not occurred.

The austenite grains described above, unlike those of hardened steel, are associated with the micro structure with ferrite generated from the austenite grain boundaries. In this case, meshed ferrite is generated along the austenite grain boundaries. Therefore, the arrangement of the austenite grain boundaries can estimated and easily measured from the meshed ferrite. The measurement can be conducted by comparing the micro structure with the JIS standard chart or by determining the average distance between a straight line drawn randomly and an intersection thereof with the estimated austenite grain boundaries.

EFFECTS OF THE INVENTION

As described above, according to this invention, there is provided a bearing device for a wheel in which no cracking is liable to occur after the caulking process and of which the management is facilitated for quality control, while the durability is not deteriorated and the weight can be easily reduced even in the case where the wheel-mounting flange is formed in the shape of an arm.

DESCRIPTION OF THE REFERENCE SIGNS

1: Ball (rolling element), 2: Inner ring, 2a: Raceway surface, 3: Outer ring, 3a: Raceway surface, 4: HUB ring, 4a: Raceway surface, 4b: Caulked portion, 4c: Non-cut portion, 4d: Wheel-mounting flange, 4h: Surface hardened layer, 4n: Root of wheel-mounting flange, 4s: HUB ring stepped wall, 10: Bearing device for a wheel, 11: HUB bolt, 12: Bolt, 12a: Female screw, 15: Knuckle, 21: Roller (rolling element), 31: Ball of Constant Velocity Joint, 32: Inner ring of Constant Velocity Joint, 33: Outer joint of Constant Velocity Joint, 33a: Shaft (spline) of Constant Velocity Joint, 34: Cage of Constant Velocity Joint, 35: Shaft, 50: Constant Velocity Joint

BEST MODES FOR CARRYING OUT THE INVENTION

Figure 1:
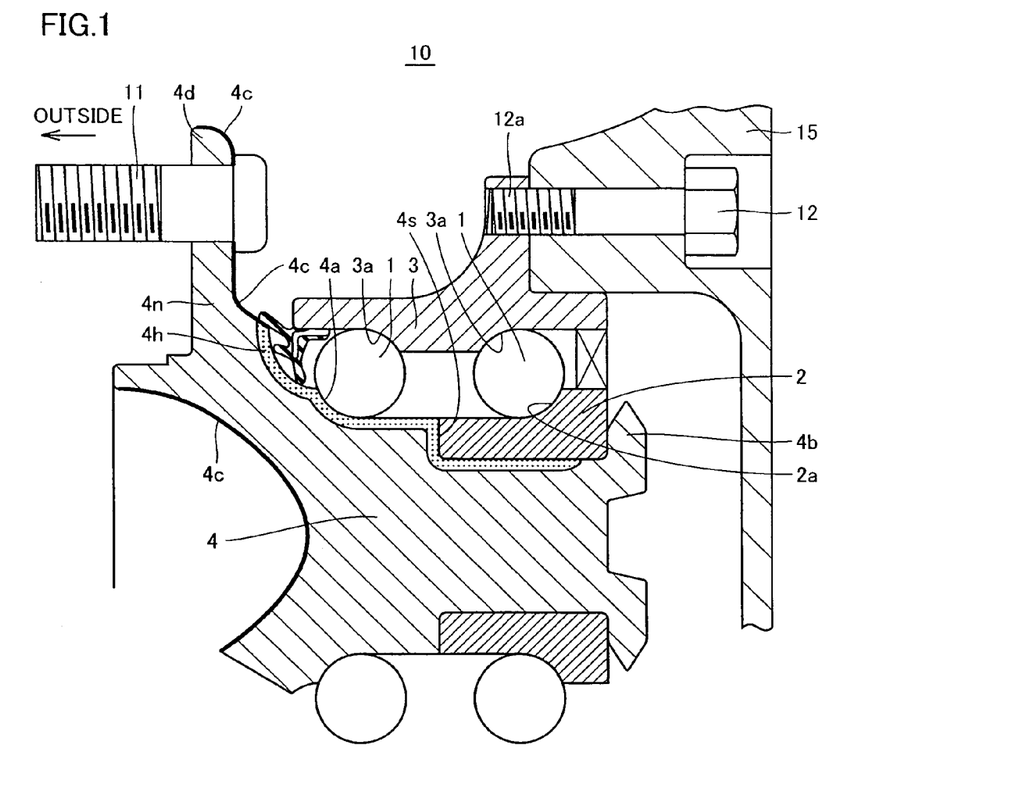
FIG. 1 is a diagram showing a bearing device for a wheel according to an embodiment of the invention.

Next, embodiments of the present invention are explained with reference to the drawings. FIG. 1 shows a bearing device for a wheel 10 according to an embodiment of the invention used for a non-driven wheel. A HUB ring 4 and an inner ring 2 are coupled to each other by caulking HUB ring 4 in such a manner as to fasten inner ring 2. The HUB ring has a non-cut portion. In FIG. 1, outer ring 3 is coupled to a knuckle 15 with bolt 12 screwed to a female screw 12a. A plurality of balls 1 in two rows are arranged by a plurality of rows of raceway surface 3a, a raceway surface 2a of inner ring 2 and a raceway surface 4a of HUB ring 4. The raceway surfaces on which a high load is imposed from the balls are formed with a surface hardened layer by high-frequency induction hardening or the like. FIG. 1 shows only a surface hardened layer 4h formed by high-frequency induction hardening of the surface layer including the raceway surfaces of HUB ring 4. Nevertheless, a surface hardened layer, though not shown, is formed on outer ring 3 and inner ring 2 as well as HUB ring 4.

A HUB bolt 11 is arranged on HUB ring 4 and rotatably supports by being connected to a tire not shown. In the structure shown in FIG. 1, the hole for HUB bolt 11 is formed on wheel-mounting flange 4d. To reduce the weight, wheel-mounting flange 4d may be employed as an arm for each HUB bolt.

In FIG. 1, a surface 4c on the inboard side of the wheel-mounting flange and a central outer surface 4c of HUB ring 4 are non-cut surfaces. The surface characteristic and the dimensional accuracy of these surfaces are not so important and therefore the production cost is reduced by non-cut finishing.

As described above, inner ring 2 is caulked by caulked portion 4b of HUB ring 4, and while pressed against stepped wall 4s of HUB ring 4, coupled to HUB ring 4. According to this embodiment, HUB ring 4 is a first inner member and inner ring 2 a second inner member. The oscillatory caulking method is used for caulking. In this oscillatory caulking process, the grain size number of the austenite grains in the micro structure is set to a fine level of 6 or more for the portion not subjected to high-frequency induction hardening or especially caulked portion 4b. By doing so, a cracking is not easily formed by caulking in the as-hot-forged state.

In FIG. 1, HUB ring 4 and outer ring 3 are formed using a particulate ferrite generating steel material. HUB ring 4 and outer ring 3, therefore, have a high ductility and toughness regardless of normalizing. As a result, while a cracking is easily caused in the coarse micro structure shown in FIG. 4 later, the generation of a cracking can be suppressed in the ferrite pearlite structure containing particulate ferrite shown also in FIG. 3. Thus, the caulking process can be carried out without causing any cracking. Also, no cracking is generated at root 4n of the wheel-mounting flange under the repetitive load while in use.

Figure 2:
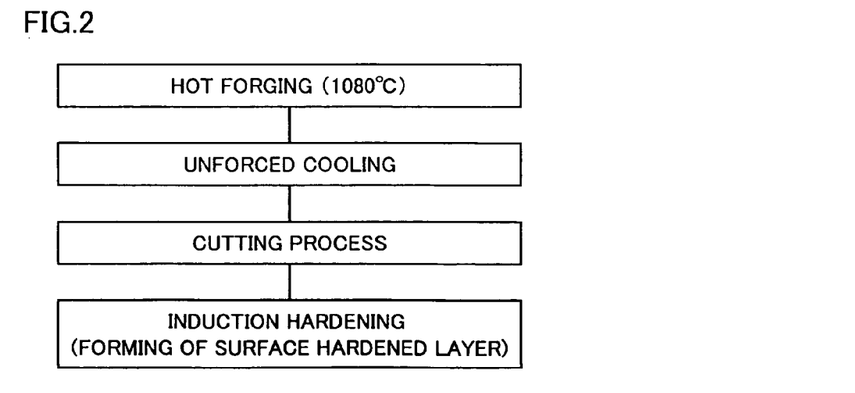
FIG. 2 is a diagram showing a method of fabricating the parts of a bearing device for a wheel according to the embodiment of the invention.

FIG. 2 is a diagram showing a method of fabricating the parts of the bearing device for a wheel according to the embodiment of the invention. Steel material (hereinafter referred to as "the particulate ferrite generating steel material") containing 0.45 to 0.70 mass % of carbon C and not more than 0.3 mass % in total of at least one of V, Nb and Ti is hot forged after being heated to, say, about 1080° C. and cooled unforcedly. In this stage, the parts described above are formed substantially to the respective shape. After that, a portion requiring dimensional accuracy and finish surface accuracy (roughness, etc.) is precisely finished by the cutting process. After that, a predetermined portion of the surface subjected to the cutting process is hardened by the high-frequency induction hardening process.

As described above, in the case where the total for the elements including at least one of V, Nb and Ti exceeds 0.3 mass %, the required toughness and ductility are difficult to secure. The total is therefore set to 0.3 mass % or less. The total described above, if less than 0.01 mass %, however, a ferrite nucleation site cannot be formed with a sufficient dispersion density and therefore may be set to not less than 0.01 mass %. To secure a more positive effect, the total may be set to not less than 0.02 mass %.

The steel described above contains Si and Mn equivalent to the representative steel types included in the structural steel materials (H steel: JISG4052) with a guaranteed hardenability other than carbon, V, Nb and Ti, and may further contain not more than 0.25 mass % of Ni, not more than 1.25 mass % of Cr and not more than 0.45 mass % of Mo. Especially, this steel may contain 0.10 to 0.40 mass % of Cr. Although Cr is effective for improving the hardenability and the tempering softening resistance, at least 0.1 mass % is required to confirm the effect thereof. With more than 0.40 mass %, however, the hot forging workability is reduced and results in a high hot forging cost. Therefore, not more than 0.40 mass % is recommended.

In the above-mentioned cutting process, the non-cut portion can be left without being cut. The portion cut in this method can be limited to the portion required for finish accuracy, and the other portion can be left without being cut. As the result, s cost of the cutting process can be reduced.

Figure 3:
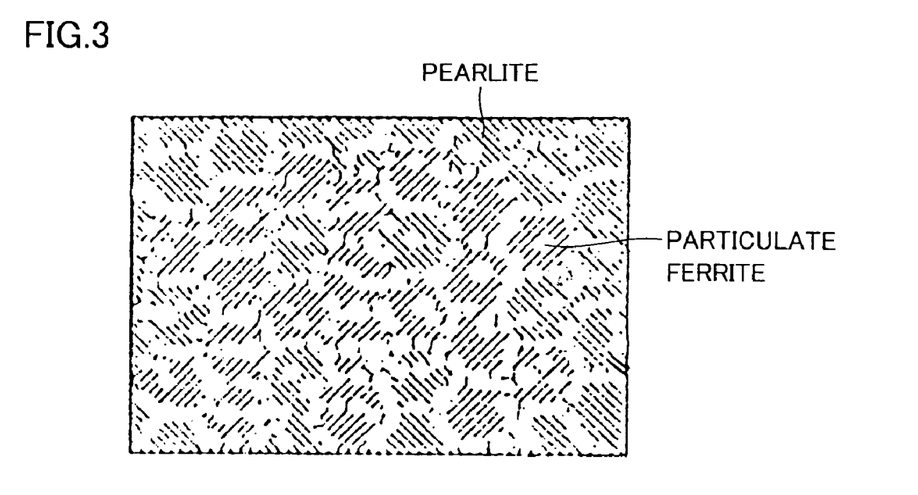
FIG. 3 is a schematic diagram showing a micro structure of a steel obtained by hot forging and unforced cooling a steel according to the embodiment of the present invention.

FIG. 3 is a schematic diagram showing a micro structure obtained by hot forging and leaving the aforementioned steel to cool unforcedly. The steel containing at least one of V, Nb and Ti contains carbo-nitrides not solid soluble at 1000° C. or higher in the heating session before hot forging. The carbo-nitrides work by pinning against the movement of the austenite grain boundaries and suppresses the coarsening of the austenite grains. Also, the fine carbo-nitrides precipitate and form resistance to the growth of the austenite grains at the time of recrystallization of the hot working structure during temperature decrease. After hot forging, during the process of unforced cooling, ferrite transformation is generated from the austenite during the temperature decrease, followed by generation of pearlite transformation. In the process, as a phenomenon unique to the particulate ferrite generating steel material described above, the ferrite transformation is promoted so that the area ratio of ferrite is increased while at the same time the particulate ferrite is generated at a high ratio. As a result, the pearlite particles are substantially segmented by ferrite and fined. The particulate ferrite is promoted as described above because the carbo-nitrides of V, Nb or Ti are generated during the recrystallization in the hot forging process or the subsequent process of unforced cooling and the ferrite transformation occurs with the carbo-nitrides as nucleation sites. These carbo-nitrides and the like precipitate both at boundaries and interior of the austenite grains, and therefore the particulate ferrite is generated both at boundaries and interior of the grains. In FIG. 3, some ferrite is generated along the grain boundaries without the core of the carbo-nitride.

The particulate ferrite can be judged from a shape thereof. The ferrite located in the grains is the particulate ferrite. The particulate ferrite may be generated at the graing boundaries. The meshed ferrite is generated along the grain boundaries in a form of a band rather than the particle. The area ratio of ferrite can be measured by using a commercially available area ratio automatic measuring instrument due to ease with which ferrite and pearlite can be discriminated from each other in the micro structure. The ferrite area ratio can be measured also by determining and averaging a proportion of the portion of an arbitrary straight line existing in the ferrite within a visual field of an optical microscope.

Figure 4:
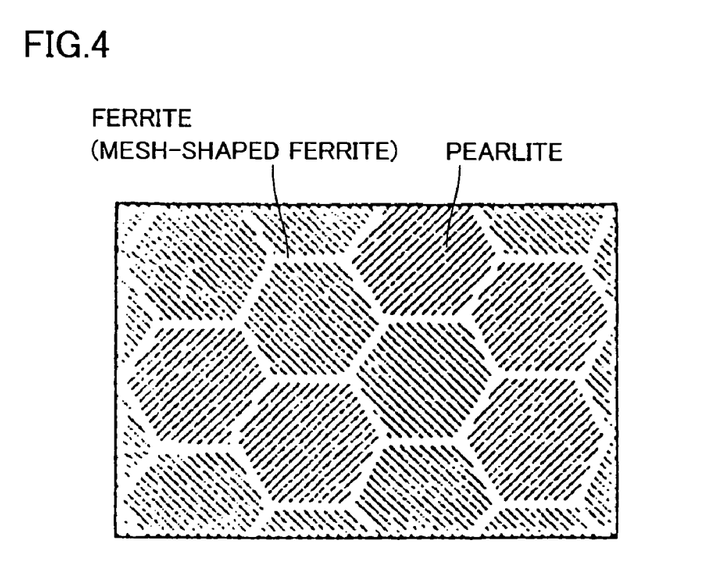
FIG. 4 is a schematic diagram showing a micro structure obtained by hot forging and unforced cooling carbon steel for a machine structural use; S53C.

A schematic diagram of a micro structure obtained with a carbon steel not containing V, Nb or Ti subjected to the process of hot forging and unforced cooling is shown in FIG. 4. According to FIG. 4, ferrite is generated in the meshed form at the austenite grain boundaries during the process of unforced cooling, after which the austenite is transformed to pearlite. The pearlite, therefore, is more coarse than shown in FIG. 3. Also, in view of the fact that the ferrite transformation is not promoted, the ferrite area ratio is smaller than the ratio of micro structure shown in FIG. 3.

HUB ring 4 and outer ring 3 in FIG. 1 are formed of the ferrite generating steel material described above. Therefore, the austenite crystal grain size number in as-hot-forged state without normalizing is not less than 6. The as-hot-forged state without normalizing can be specified by analyzing the composite structure of the scale on the oxide surface of the non-cut portion. Also, steel normally contains Al which is combined with nitrogen to form AlN. AlN is solid soluble in steel at the hot forging temperature and precipitate at a comparatively high rate at the normalizing temperature. In the case where no normalizing process is carried out after hot forging, the amount of Al existing as solid solution in the steel without forming AlN increases, and therefore the as-hot-forged state can be specified by the status analysis of Al.

Aluminum is added to aluminum killed steel as a deoxidiser at the time of melting and discharged as non-metallic inclusions such as an oxide. Aluminum not discharged as non-metallic inclusions exists in the steel in the form of solid solution aluminum and aluminum nitride AlN. Specifically, it exists in the form of soluble aluminum (sol Al). The content of this sol Al is preferably not less than 0.015 wt %, because if excessive, the non-metallic inclusions including AlN are increased for a reduced ductility. Thus, the content of not more than 0.05 wt % is preferable.

The status analysis for distinguishing the sol Al between the state of solid solution Al and the state of AlN is conducted using a product in as-hot-forged state and a product normalized subsequently. As the result of comparing the two cases, the product higher in the ratio of solid solution Al can be specified as a product in as-hot-forged state. Once this standard measurement is conducted on a product in as-hot-forged state and a product subsequently normalized, both cases can be specified based on the resultant data.

Figure 5:
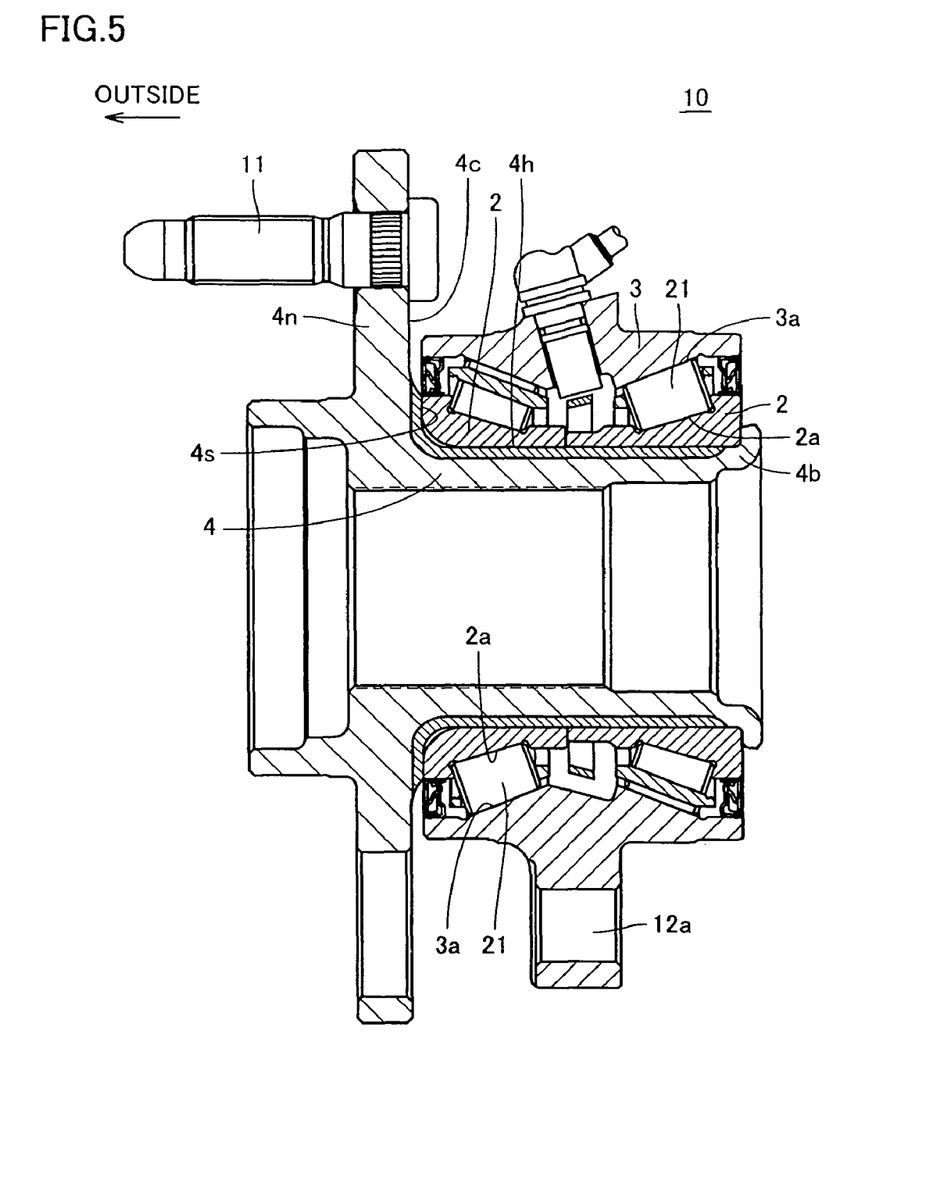
FIG. 5 is a diagram showing still another bearing device for a wheel according to the embodiment of the present invention.

FIG. 5 is a diagram showing a bearing device for a wheel 10 for a driven wheel using a roller 21 as a rolling element according to another embodiment of the invention. In bearing device for a wheel 10, no raceway surface is formed on HUB ring 4, but raceway surfaces 2a, 3a are formed on outer ring 3 and two inner rings 2. Outer ring 3 and HUB ring 4 are fabricated of the particulate ferrite generating steel material described above, while inner ring 2 and roller 21 are fabricated using JIS SUJ2. According to this embodiment, HUB ring 4 constitutes a first inner member, and two inner rings 2 correspond to a second inner member.

HUB ring 4 is not formed with a raceway surface. In order to deal with the load imposed through inner ring 2, however, a surface hardened layer 4h is formed by high-frequency induction hardening of the surface in contact with two inner rings 2.

Two inner rings 2 are fixedly pressed against stepped wall 4s of HUB ring 4 by caulked portion 4b obtained by caulking HUB ring 4.

The grain size number of the austenite grains before caulking caulked portion 4b of HUB ring 4 is not less than 6. HUB ring 4 is fabricated of particulate ferrite generating steel material.

Figure 6:
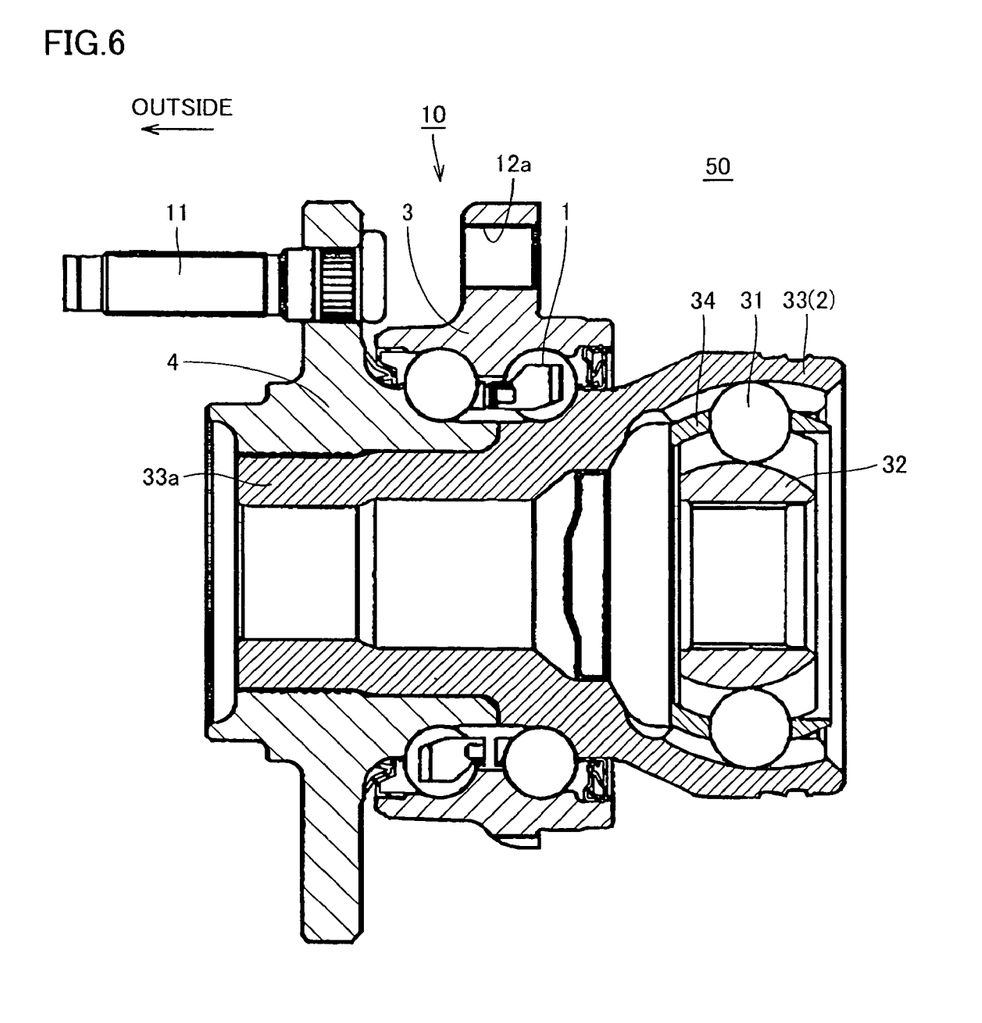
FIG. 6 is a diagram showing a bearing device for a wheel formed in combination with a Constant Velocity Joint according to an embodiment of the invention.

FIG. 6 shows a bearing device for a wheel 10 for a driven wheel according to another embodiment of the present invention. A Constant Velocity Joint 50 is combined and doubles as inner ring 2 of the bearing device for a wheel. Constant velocity joint 50 includes an inner ring 32, an outer joint 33 equivalent to the outer ring and a torque transmission ball 31 held by a cage 34 between outer joint 33 and inner ring 32. The rotating effort is transmitted from Constant Velocity Joint 50 to HUB ring 4, and further to the tire coupled by a HUB bolt 11. The end of a shaft 33a of outer joint 33 of Constant Velocity Joint 50 is fixed on HUB ring 4 by diameter-enlarging caulking. According to this embodiment, outer joint 33 of Constant Velocity Joint 50 is a first inner member, and HUB ring 4 constitutes a second inner member. The grain size number of the austenite grains of shaft 33a of outer joint 33 is not less than 6. In this combination, HUB ring 4, outer ring 3 and outer joint 33 of Constant Velocity Joint 50 doubling as inner ring 2 of bearing device for a wheel 10 are fabricated of the particulate ferrite generating steel material.

FIRST EXAMPLE

Next, the result of the study actually made about the mechanical properties and the micro structure is explained. Table 1 shows the composition of the steel material used in the first example of the invention. Each steel according to an example of the invention is improved based on S53C. The feature of the composition is as follows. Specifically, in examples 3 and 4 of the invention, V or the like is contained with a low Mn content.

(Example 1 of the invention) S53C equivalent plus V of 0.08 mass %
(Example 2 of the invention) S53C equivalent plus Ti of 0.07 mass %
(Example 3 of the invention) low Mn (0.25 mass %) plus V of 0.09 mass %
(Example 4 of the invention) low Mn (0.24 mass %) plus V of 0.04 mass % and Ti of 0.06 mass %
(Comparative Example 1, and Examples 5 and 6 of the invention) S53C

TABLE 1

| Example | Fabrication Method | C | Si | Mn | P | S | Cr | V | Ti |
| --- | --- | --- | --- | --- | --- | --- | --- | --- | --- |
| Example 1 of Invention | V Added, as-Hot-Forged at 1020° C. | 0.55 | 0.20 | 0.73 | 0.007 | 0.016 | 0.19 | 0.08 | — |
| Example 2 of Invention | Ti Added, as-Hot-Forged at 1020° C. | 0.55 | 0.21 | 0.73 | 0.008 | 0.016 | 0.19 | — | 0.07 |
| Example 3 of Invention | (Developed Steel 1) As-Hot-Forged at 1020° C. | 0.55 | 0.28 | 0.25 | 0.005 | 0.017 | 0.22 | 0.09 | — |
| Example 4 of Invention | (Developed Steel 2) As-Hot-Forged at 1020° C. | 0.56 | 0.24 | 0.24 | 0.006 | 0.016 | 0.21 | 0.04 | 0.06 |
| Comparative Example 1 | As-Hot-Forged at 1020° C. (conventional material) | 0.53 | 0.22 | 0.75 | 0.008 | 0.017 | 0.20 | — | — |
| Example 5 of Invention | Normalizing Added | | | | " | | | | |
| Example 6 of Invention | As-Hot-Forged at 950° C. | | | | " | | | | |

The fabrication method is described below.

(Examples 1 to 4 of the invention) Hot forged after being heated to 1020° C. and cooled unforcedly
(Comparative example 1) Hot forged after being heated to 1020° C. and cooled unforcedly
(Example 5 of invention) Hot forged after being heated to 1020° C. and cooled unforcedly and normalized
(Example 6 of invention) Hot forged after being heated to 950° C. and cooled unforcedly The comparative example 6 has the feature in that V, Ti and Nb are not contained and the hot forging temperature is extremely reduced. The hot forging temperature, if decreased to about 950° C., increases the deformation resistance and shortens the life of the forging die. Therefore, example 6 is difficult to employ in the production field. Nevertheless, the study was made for the purpose of examining the performance of the hot forged steel.

The micro structures according to examples of the invention and comparative example are shown in FIGS. 7 to 13. First, in the micro structure according to comparative example 1 reflecting the as-hot-forged state, the structure is coarse (note the scale), and substantially all the ferrite are meshed one generated along the austenite grain boundaries. In the micro structure according to example 5 of the invention including the normalizing process shown in FIG. 12, in contrast, not only the string-shaped ferrite along the boundaries but also particulate (lump) ferrite are observed, and the micro structure is very fine. Also, according to example 6 of the invention including the forging process heated at 950° C., the micro structure is equivalent to that of example 5 of the invention normalized in spite of being in as-hot-forged state.

As shown in FIGS. 7 to 10, examples 1 to 4 of the invention using a steel material containing V, Ti, etc. have a very fine micro structure, great many particulate ferrite and a high dispersion density of the particulate ferrite in spite of being in as-hot-forged state. Also, the ferrite area ratio is increased. Especially in example 4 of the invention, the micro structure is fined.

The result of a test conducted on the test pieces described above is shown in table 2. A tensile test was conducted on a test piece cut out of a HUB product.

TABLE 2

Figure 7:
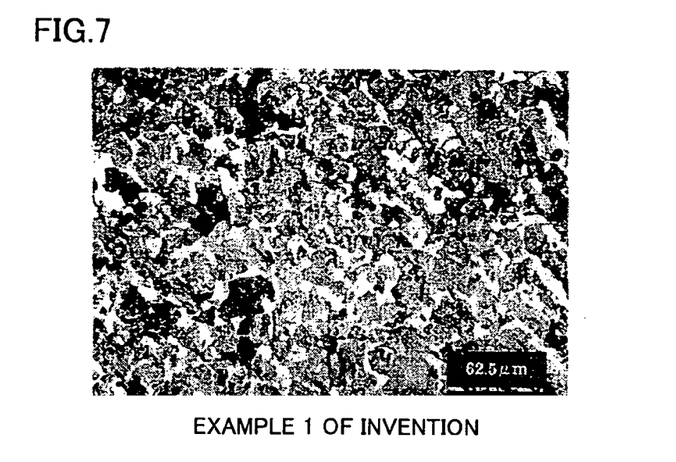
FIG. 7 is a diagram showing a micro structure of example 1 of the present invention in the first example of the invention.
Figure 8:
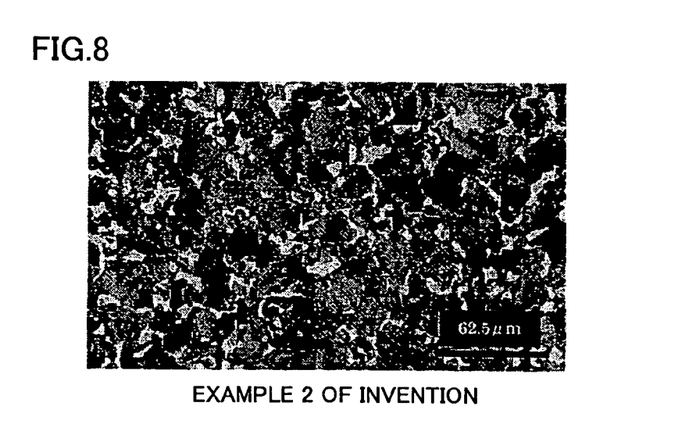
FIG. 8 is a diagram showing a micro structure of example 2 of the present invention in the first example of the invention.
Figure 9:
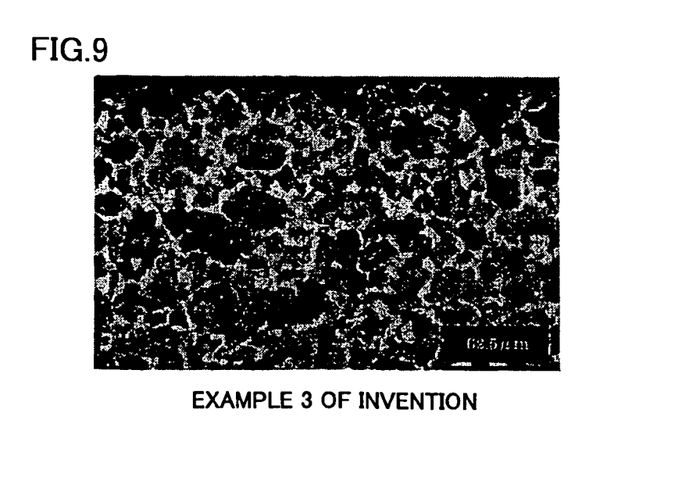
FIG. 9 is a diagram showing a micro structure of example 3 of the present invention in the first example of the invention.
Figure 10:
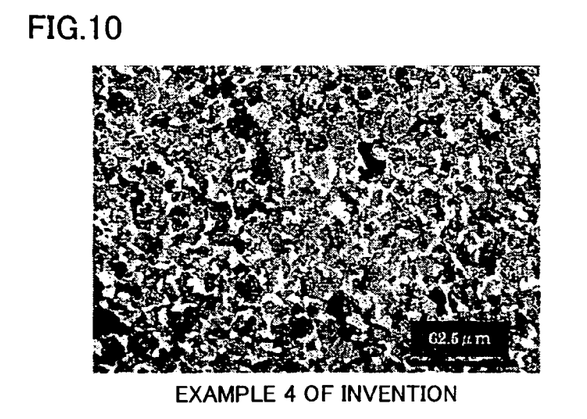
FIG. 10 is a diagram showing a micro structure of example 4 of the present invention in the first example of the invention.
Figure 11:
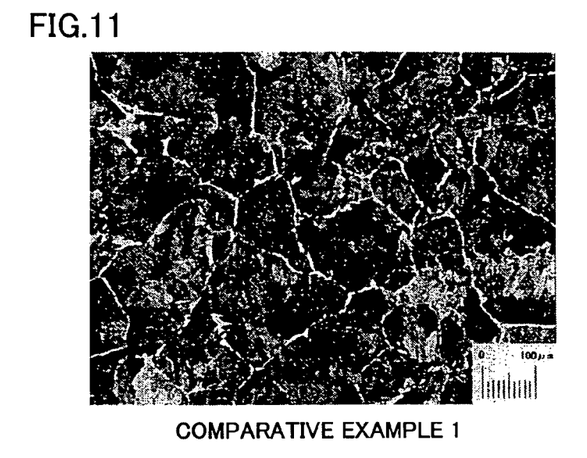
FIG. 11 is a diagram showing a micro structure of comparative example 1 in the first example of the invention.
Figure 12:
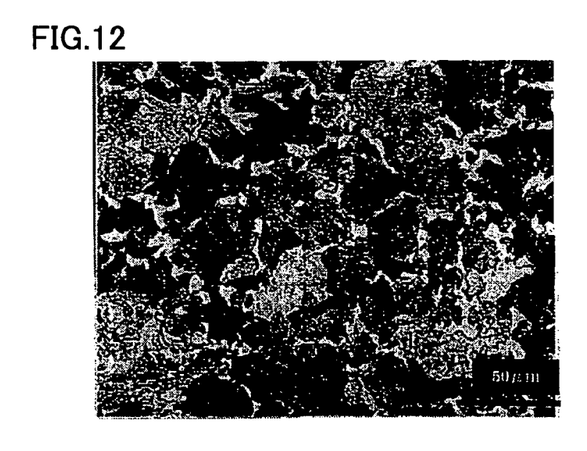
FIG. 12 is a diagram showing a micro structure of example 5 of the present invention in the first example of the invention.
Figure 13:
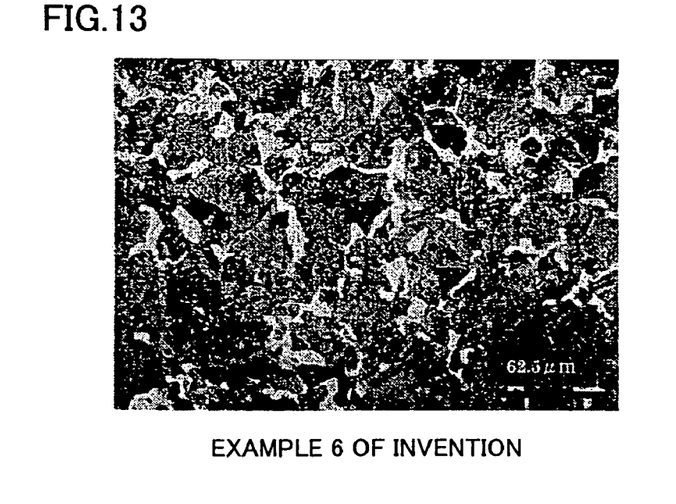
FIG. 13 is a diagram showing a micro structure of example 6 of the present invention in the first example of the invention.

| Example | Specification | Area Ratio (Ferrite) (%) | Grain Size (Grain Size No.) | Hardness Change Rate (%) | Reduction Improvement Ratio (%) | Tensile Strength Improvement (MPa) | Drawing |
|---|---|---|---|---|---|---|---|
| Example 1 of Invention | V Added, as-Forged | 21 | 7.0 | +1 | 14 | 11 | FIG. 7 |
| Example 2 of Invention | Ti Added, as-Forged | 17 | 6.8 | +2 | 12.5 | 13 | FIG. 8 |
| Example 3 of Invention | (Developed Steel 1) as-Forged | 24 | 7.7 | −7 | 20 | 15 | FIG. 9 |
| Example 4 of Invention | (Developed Steel 2) as-Forged | 28 | 8.0 | −6 | 15 | 16 | FIG. 10 |
| Comparative Example 1 | as-Forged (conventional material 1) | 12 | 3.0 | Reference | Reference | Reference | FIG. 11 |
| Example 5 of Invention | Normalizing Added | 20 | 7.0 | −7 | 15 | 10 | FIG. 12 |
| Example 6 of Invention | As-Hot-Forged at 950° C. | 22 | 6.5 | −4 | 11 | 9 | FIG. 13 |

Table 2 shows that the ferrite area ratio in comparative example 1 is 12%, while examples 1 to 4 of this invention, the figure is as high as not less than 15% in spite of the as-hot-forged state. Also in example 5 of the invention including the normalizing process and example 6 of the invention in the as-hot-forged state at 950° C., the ferrite area ratio is not less than 15%. In Table 2, the "grain size" is that of the austenite of which the approximate contour thereof is plotted with the meshed ferrite. As compared with comparative example 1 with the grain size number 3.0, however, examples 1 to 6 of the invention can produce the figure of not less than 6.5, indicating that the micro structure is fined.

The measurement of the austenite grains can be determined by assuming that the austenite grain boundaries exists in the meshed ferrite of the micro structure and by comparing the micrograph describing such an austenite grain boundaries with a reference chart of grain size defined under JIS. Specifically, in the case where very narrow meshed ferrite is generated along the austenite grain boundaries, the measurement can be conducted by regarding the meshed ferrite as the austenite grain boundaries. Also, in the case where the ferrite generated along the austenite grain boundaries of the meshed ferrite is comparatively wide, on the other hand, measurement can be conducted by assuming the austenite grain boundaries existent within the ferrite width along the ferrite or by actually noting it in the microphotograph. A line indicating the austenite grain boundaries can be easily written in the microphotograph within the width of the meshed ferrite along the same ferrite.

The hardness change rate is an index as to whether the test piece is hardened (+) or softened (−) with reference to comparative example 1. According to examples 1 and 2 of the invention, the hardness change rate is positive in spite of the fact that the ferrite area ratio is increased as compared with the reference probably because the micro structure is substantively fined very much and that V or Ti precipitates dispersed to be dispersion-strengthened. In examples 3 and 4 of the invention, the test piece is softened in spite of the fact that V and/or Ti is contained because Mn is lowered. Especially, example 3 of the invention is softened greatly. Reflecting this trend, the reduction in example 3 of the invention is conspicuously increased. Also in examples 1, 2, 4 to 6 of the invention, the reduction improvement rate of not more than 10% is obtained as compared with comparative example 1.

The tensile strength can be increased not less than 9% over comparative example 1 for any of examples 1 to 6 of the invention. The increase is especially conspicuous for examples 3 and 4 of the invention.

The reduction obtained by the tensile test is correlated with the deformability and the cracking characteristic in the caulking process, and desirably as great as possible. Also, the tensile strength and the reduction correspond to the bending strength characteristic of the product.

From the first example described above, it could be confirmed that according to examples 1 to 6 of the invention, as compared with comparative example 1, the ferrite area ratio is increased with a very fine micro structure and not less than 6 in the austenite grain size number. Thus, it was confirmed that the strength, the workability and the bending strength can be improved. It was also found that according to examples 3 and 4 of the invention, the strength and the workability are higher than the examples with the normalizing process added.

SECOND EXAMPLE

Next, endurance test was conducted on the steel used in the manufacture of the HUB ring or the outer ring of the bearing device for a wheel described above. This test can be considered to verify a life against the repetitive stress imposed on the root of the flange or the arm at a position nearer to the center from the HUB bolt hole of the HUB ring. The steel used in the examples of this invention contains C of 0.6 mass %, Si of 0.57 mass %, Mn of 0.8 mass %, P of 0.015 mass %, S of 0.017 mass %, Cr of 0.25 mass % and V of 0.15 mass %. The steel used in comparative example 1, on the other hand, is the commercially available carbon steel for machine structural use; S53C defined in JIS G4051.

The steel materials according to the examples of the invention and the comparative example were hot forged and cooled unforcedly as shown in FIG. 2, to produce test pieces. No sample was normalized.

As to the test, the caulking workability was evaluated by reduction in the tensile test defined in JIS Z2241 on the one hand, and based on the rotating bending fatigue test defined in JIS Z2274, durability against the repetitive stress imposed on the HUB ring was evaluated on the other hand. A round rod having a horizontal portion 15 mm long and 5 mm in diameter was used as a test piece for the tensile test, and No. 1 test piece (JIS Z2274) was used for the rotating bending fatigue test.

Figure 14:
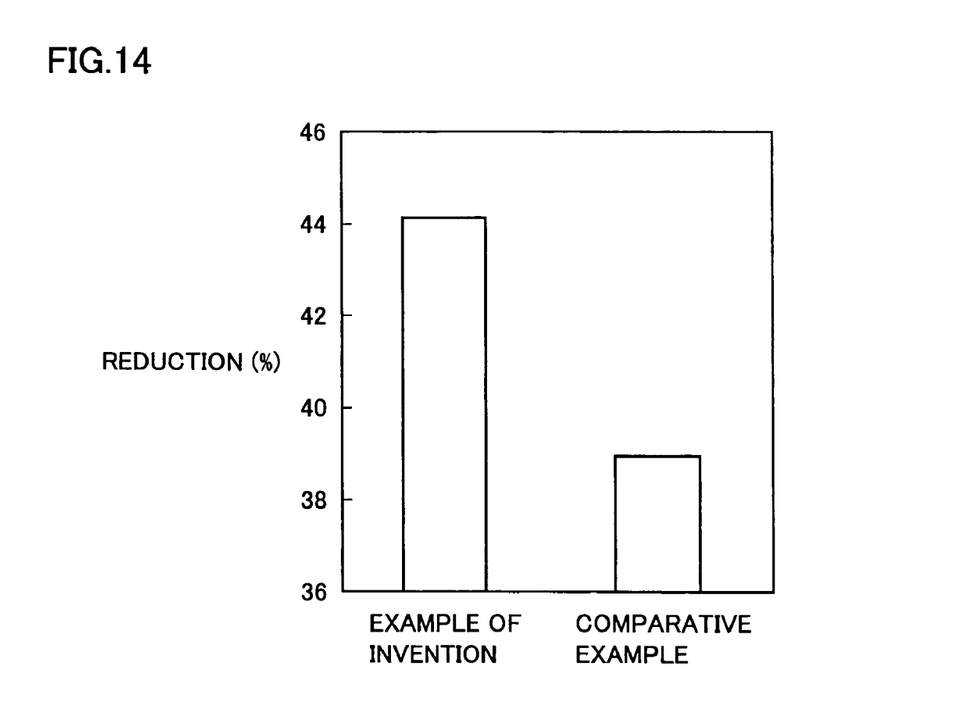
FIG. 14 is a diagram showing reduction in a tensile test conducted in the third example of the invention.
Figure 15:
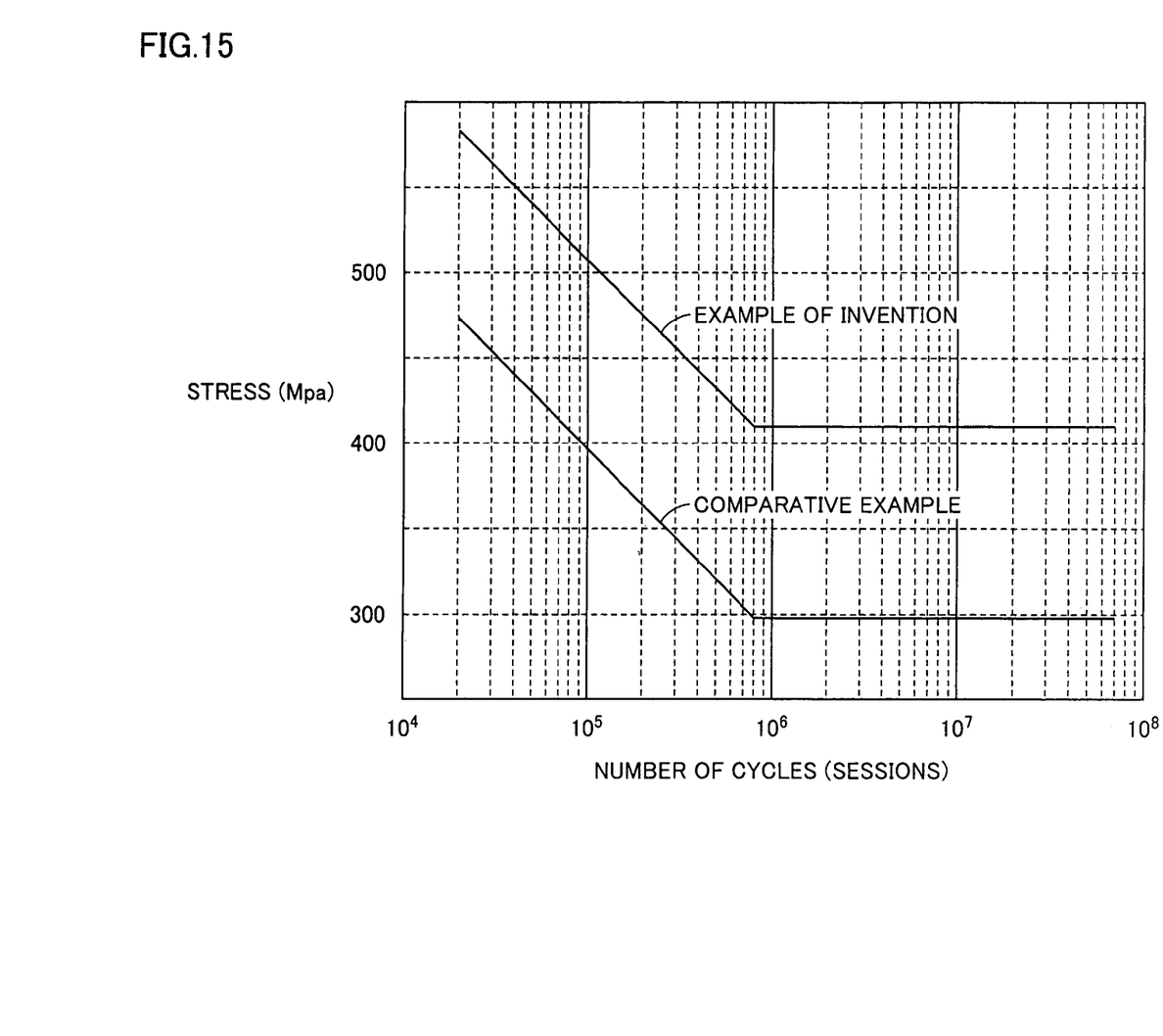
FIG. 15 is a diagram showing a result of a rotating bending fatigue test conducted in the third example of the invention.

A result of reduction in the tensile test is shown in FIG. 14, and a result of the rotating bending fatigue test is shown in FIG. 15. The reduction in the comparative example was 39%, while the reduction in the examples of the invention was improved greatly to 44%. The reduction and the caulking workability are strongly correlated to each other, and the caulking workability is greatly improved by the reduction improvement as much as shown in FIG. 14.

Also, the result of the rotating bending fatigue test in FIG. 15 shows that the rotating bending fatigue strength of the example of the invention is improved about 30% higher than that of the comparative example.

The foregoing result shows that by fabricating the bearing parts using steel in the as-hot-forged state without the normalizing process, the parts high in durability can be fabricated and a bearing having a high performance can be fabricated at low cost by assembling the parts. Also, the HUB ring or the like, among others, can be caulked without developing any crack.

Next, examples of the embodiments of the invention including those embodiments and examples described above are explained below one by one.

The ferrite area ratio of the first inner member subjected to the aforementioned caulking process is 10 to 30 volume %, and the particulate ferrite can be included.

This configuration can soften the first inner member and improve the ductility. As a result, the chance of cracking is eliminated even in the strong caulking process.

The first inner member is a HUB ring, the second inner member is an inner ring, and the HUB ring can be coupled to the inner ring by caulking the end of the HUB ring. Also, the second inner member is a HUB ring, the first inner member is an outer joint member of the Constant Velocity Joint, and the shaft of the outer joint member can be coupled with the HUB ring by inserting the shaft into the inner hole of the HUB ring and subjecting the shaft to the diameter-enlarging caulking process.

The aforementioned configuration can secure the light weight of the bearing device for a wheel and achieve a high reliability as a wheel bearing.

Also, the HUB ring constituting the first or second inner member has a wheel-mounting flange, and the grain size number of the austenite grains of the HUB ring portion not hardened can be not less than 6.

With the configuration described above, the durability of the wheel-mounting flange can be improved, and the weight reduction can be easily achieved without reducing the durability even in the case where the wheel-mounting flange is formed in the shape of an arm.

The steel described above (particulate ferrite generating steel material) can contain Si of 0.15 to 0.7 mass %, Mn of 0.1 to 0.5 mass % and V of 0.04 to 0.15 mass %.

With this configuration, the decarburization depth in the hot forging process is suppressed and the V carbo-nitrides act to promote generation of ferrite, thereby making it possible to obtain a structure containing the particulate ferrite. As a result, the micro structure can be substantially fined.

Si of 0.15 to 0.7 mass %

With Si of less than 0.15 mass %, the hardenability is so low that a sufficient strength cannot be secured. With Si of more than 0.7 mass %, on the other hand, the decarburization is promoted and the deep decarburized layer is formed in the hot forging process. Therefore, Si is set to not more than 0.7 mass %. To further suppress the decarburized layer, Si is can be set to not more than 0.5 mass %. Further, to avoid the decarburized layer, Si should be set to not more than 0.4 mass %.

Mn of 0.1 to 0.5 mass %

With Mn of less than 0.1 mass %, sulfur (S) in the steel cannot be fixed as MnS, and thereby a cracking is liable to occur during the hot forging process. Therefore, Mn is set to not less than 0.1 mass %. Mn improves the hardenability and is contained as solid solution in steel to increase toughness, while at the same time increasing the retained austenite contributing to the rolling contact fatigue life. However, Mn is contained as solid solution also in the carbide and acts to increase the hardness of the carbide, thereby effectively working to increase the hardness of steel. To attain a higher toughness, Mn of not less than 0.25 mass % should be contained. With Mn of more than 0.5 mass %, however, generation of ferrite is suppressed during unforced cooling after the hot forging process, and a hardened structure is liable to occur. This hampers the cutting and caulking workability, and therefore, Mn can be set to not more than 0.5 mass %.

V of 0.04 to 0.15 mass %

The V carbides, the V nitrides or the V carbo-nitrides, though contained substantially as solid solution in the austenite by being heated before the hot forging process, precipitate during unforced cooling after the hot forging process and function as the ferrite nucleation sites. These V precipitates precipitate on the inclusions, etc. in the austenite grains, and ferrite is further generated with the V precipitates as the nucleus. Specifically, generation of the particulate ferrite is promoted, resulting in an increased ferrite area ratio. This function can be obtained by V of not less than 0.04 mass %. To secure this function more positively, V of 0.06 mass % is desirably contained. Also, in view of the fact that the aforementioned effect is saturated by V of more than 0.15 mass %, V should be set to not more than 0.15 mass %.

Incidentally, as to the impurity elements, P is desirably set to not more than 0.030 mass % and S to not more than 0.035 mass %. The impurity elements P and S deteriorate the mechanical properties of steel and therefore should be as low in content as possible for application as steel for bearings. A sophisticated refining equipment and sufficient refining time are required, however, to reduce P and S contents greatly. The power cost for operation of the refining equipment and the cost of the refining reaction materials are increased, however, resulting in a considerably increased overall cost. Therefore, the upper limit of P and S can be a level meeting the cleanliness restrictions (JIS G4051) adapted to allow the deterioration of the mechanical properties as the bearing material.

At least one of the parts comprising the bearing can include a non-cut part not subjected to the cutting process.

The cutting process for the portion not requiring the cutting for the reason of precision can be omitted to suppress the manufacture cost. In this case, it is important to suppress the decarburized layer with black scale, and the fatigue cracking can be suppressed. For this purpose, the Si content should be set rather low.

The embodiments disclosed above should be interpreted as illustrative but not limitative in all senses of the words. The scope of the invention is defined not by the foregoing description but by the appended claims, and intended to include all the modifications without departing from the spirit and scope of the claims.

Industrial Applicability

According to this invention, highly reliable parts are fabricated inexpensively and assembled into a bearing by caulking, and therefore a highly reliable bearing device for a wheel can be provided inexpensively. Thus, the applications of the invention are expected to widen to the bearing device for a wheel of the transportation machines and equipment including automobiles.

The invention claimed is:

1. A bearing device for a wheel comprising an outer member having a plurality of rows of raceway surfaces on an inner periphery thereof, an inner member having raceway surfaces in opposed relation to said raceway surfaces, and rolling elements interposed between the plurality of rows of said raceway surfaces in opposed relation to each other, wherein
said inner member includes a first inner member and a second inner member,
said first inner member and said second inner member are coupled to each other by caulking said first inner member, and the wheel is rotatably supported on a vehicle body,
a grain size number of an austenite grain of at least the caulked portion is not less than 6,
a ferrite area ratio of said caulked first inner member is 10 to 30 volume %, and a particulate ferrite is included, and
said inner member has the ferrite pearlite structure containing said austenite grain with dispersed particles of said particulate ferrite.

2. The bearing device for a wheel according to claim 1, wherein said first inner member is a HUB ring, said second inner member is an inner ring, and an end of the HUB ring is coupled to the inner ring by caulking.

3. The bearing device for a wheel according to claim 1, wherein said second inner member is a HUB ring, said first inner member is an outer joint member of a Constant Velocity Joint, and a shaft of said outer joint member is inserted into an inner diameter hole of the HUB ring and coupled to the HUB ring by subjecting the shaft to diameter-enlarging caulking.

4. The bearing device for a wheel according to claim 1, wherein the HUB ring constituting said first or second inner member has a wheel-mounting flange, and the grain size number of the austenite grains of a not hardened portion of the HUB ring is not less than 6.

* * * * *